United States Patent [19]

Chang et al.

[11] Patent Number: 4,780,194

[45] Date of Patent: Oct. 25, 1988

[54] ORGANIC COMPOUND CONVERSION WITH AMMONIUM HYDROXIDE AND ALKALI METAL ALUMINATE TREATED ZEOLITE

[75] Inventors: Clarence D. Chang, Princeton; Joseph N. Miale, Lawrenceville, both of N.J.

[73] Assignee: Mobil Oil Corporation, New York, N.Y.

[21] Appl. No.: 910,244

[22] Filed: Sep. 18, 1986

Related U.S. Application Data

[60] Continuation of Ser. No. 787,575, Oct. 15, 1985, abandoned, which is a continuation-in-part of Ser. No. 726,194, Apr. 22, 1985, abandoned, which is a continuation-in-part of Ser. No. 555,118, Nov. 25, 1983, Pat. No. 4,550,092, which is a division of Ser. No. 317,037, Nov. 21, 1981, Pat. No. 4,435,516.

[51] Int. Cl.$^4$ ............... C10G 11/05; C10G 47/20; C10G 49/08; C07C 01/24
[52] U.S. Cl. ............... 208/111; 208/120; 208/141; 585/408; 585/415; 585/640; 585/733
[58] Field of Search ............... 208/109, 111, 118, 120, 208/141; 585/408, 475, 415, 640, 733

[56] References Cited

U.S. PATENT DOCUMENTS

| | | | |
|---|---|---|---|
| 3,905,916 | 9/1975 | Riley et al. | 502/235 |
| 4,085,068 | 4/1978 | Gallagher et al. | 502/254 |
| 4,427,790 | 1/1984 | Miale et al. | 502/71 |
| 4,435,516 | 3/1984 | Chang et al. | 502/71 |
| 4,478,950 | 10/1984 | Chu | 502/85 |

Primary Examiner—Olik Chaudhuri
Attorney, Agent, or Firm—A. J. McKillop; M. G. Gilman; L. P. Hobbes

[57] ABSTRACT

This invention relates to acid catalysis, e.g. cracking, of organic compound feedstock, e.g. hydrocarbons, over catalyst material treated in a special way for increasing the acid catalytic activity thereof. In particular, a novel catalyst activation process is followed to enhance the alpha value of high-silica zeolite catalyst by contact with an ammoniacal solution of ammonium hydroxide and an alkali metal aluminate under appropriate conditions of time, temperature of pH.

14 Claims, No Drawings

ORGANIC COMPOUND CONVERSION WITH AMMONIUM HYDROXIDE AND ALKALI METAL ALUMINATE TREATED ZEOLITE

CROSS-REFERENCE TO RELATED APPLICATIONS

This is a continuation of copending application Ser. No. 787,575, filed on Oct. 15, 1985, now abandoned, which is a continuation-in-part of application Ser. No. 726,194, filed Apr. 22, 1985, now abandoned, which is a continuation-in-part of application Ser. No. 555,118, filed Nov. 25, 1983, now U.S. Pat. No. 4,550,092, which is a division of application Ser. No. 317,037, filed Nov. 21, 1981, now U.S. Pat. No. 4,435,516, the entire content of each being herein incorporated by reference.

FIELD OF THE INVENTION

This invention relates to acid catalysis, e.g. cracking, of organic compound feedstock over catalyst material treated in a special way for increasing the acid catalytic activity thereof. In particular, a novel catalyst activation process is followed to enhance the alpha value of high-silica zeolite catalyst by contact with an ammoniacal solution of an alkali metal aluminate under appropriate conditions of time, temperature and pH.

BACKGROUND OF THE INVENTION

Zeolite catalysts have become widely used in the processing of petroleum and in the production of various petrochemicals. Reactions such as cracking, hydrocracking, catalytic dewaxing, alkylation, dealkylation, transalkylation, isomerization, polymerization, addition, disproportionation and other acid catalyzed reactions may be performed with the aid of these catalysts. Certain natural and synthetic zeolites are known to be active for reactions of these kinds.

The common crystalline zeolite catalysts are the aluminosilicates such as Zeolites A, X, Y and mordenite. Structurally each such material can be described as a robust three dimensional framework of $SiO_4$ and $AlO_4$ tetrahedra that is crosslinked by the sharing of oxygen atoms whereby the ratio of total aluminum and silicon atoms to oxygen is 1:2. These structures (as well as others of catalytic usefulness) are porous, and permit access of reactant molecules to the interior of the crystal through windows formed of eight-membered rings (small pore) or of twelve-membered rings (large pore). The electrovalence of the aluminum that is tetrahedrally contained in the robust framework is balanced by the inclusion of cations in the channels (pores) of the crystal.

An "oxide" empirical formula that has been used to describe the above class of crystalline zeolites is

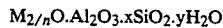

$$M_{2/n}O \cdot Al_2O_3 \cdot xSiO_2 \cdot yH_2O$$

wherein M is a cation with valence n, x has a value of from 2 to 10, and y has a value which varies with the pore volume of the particular crystal under discussion. The above oxide formula may be rewritten as a general "structural" formula

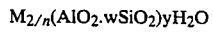

$$M_{2/n}(AlO_2 \cdot wSiO_2)yH_2O$$

wherein M and y are defined as above, and wherein w has a value from 1 to 5. In this representation, the composition of the robust framework is contained within the parenthesis, and the material (cations and water) contained in the channels is outside the parenthesis. One skilled in the art will recognize that x in the empirical oxide formula represents the mole ratio of silica to alumina in the robust framework of a crystalline zeolite, and shall be referred to herein simply by the expression in common usage, i.e. "the silica to alumina ratio". (See "Zeolite Molecular Sieves", Donald W. Breck, Chapter One, John Wiley and Sons, New York, N.Y. 1974, which is incorporated herein by reference as background material).

With few exceptions, such as with Zeolite A wherein $x=2$, there are fewer alumina tetrahedra than silica tetrahedra in the robust framework. Thus, aluminum represents the minor tetrahedrally coordinated constituent of the robust framework.

It is generally recognized that the composition of the robust framework may be varied within relatively narrow limits by changing the proportion of reactants, e.g., increasing the concentration of the silica relative to the alumina in the zeolite synthesis mixture. However, definite limits in the maximum obtainable silica to alumina ratio are observed. For example, synthetic faujasites having a silica to alumina ratio of about 5.2 to 5.6 can be obtained by changing said relative proportions. However, if the silica proportion is increased above the level which produces the 5.6 ratio, no commensurate increase in the silica to alumina ratio of the crystallized synthetic faujasite is observed. Thus, the silica to alumina ratio of about 5.6 must be considered an upper limit in a preparative process using conventional reagents. Corresponding upper limits in the silica to alumina ratio of mordenite and erionite via the synthetic pathway are also observed. It is sometimes desirable to obtain a particular zeolite, for any of several reasons, with a higher silica to alumina ratio than is available by direct synthesis. U.S. Pat. No. 4,273,753 to Chang and the references contained therein describe several methods for removing some of the aluminum from the framework, thereby increasing the silica to alumina ratio of a crystal.

For the above zeolite compositions, wherein x has a value of 2 to 10, it is known that the ion exchange capacity measured in conventional fashion is directly proportional to the amount of the minor constituent in the robust framework, provided that the exchanging cations are not so large as to be excluded by the pores. If the zeolite is exchanged with ammonium ions and calcined to convert it to the hydrogen form, it aquires a large catalytic activity measured by the alpha activity test, which test is more fully described below. And, the ammonium form of the zeolite desorbs ammonia at elevated temperature in a characteristic fashion.

Synthetic zeolites wherein x is greater than 12, which have little or substantially no aluminum content, are known. Such zeolites have many important properties and characteristics and a high degree of structural stability such tht they have become candidates for use in various processes including catalytic processes. Materials of this type are known in the art and include high silica content aluminosilicates, such as ZSM-5 (U.S. Pat. No. 3,702,886), ZSM-11 (U.S. Pat. No. 3,709,979), and ZSM-12 (U.S. Pat. No. 3,832,449) to mention a few. Unlike the zeolites described above wherein $x=2$ to 5, the silica to alumina ratio for at least some of the high silica content zeolites is unbounded. ZSM-5 is one such example wherein the silica to alumina ratio is at least 12. U.S. Pat. No. 3,941,871 discloses a crystalline metal organosilicate essentially free of aluminum and exhibiting an X-ray of diffraction pattern characteristic of ZSM-5. U.S. Pat. Nos. 4,061,724, 4,073,865 and 4,104,294 describe microporous crystalline silicas or organosilicates wherein the alumina content present is at very low levels. Some of the high silica content zeolites contain boron or iron.

Because of the extremely low alumina content of certain high silica content zeolites, their catalytic activity is not as great as materials with a higher alumina content. Therefore, when these materials are contacted with an acidic solution and thereafter are processed in a conventional manner, they are not as catalytically active for acid-catalyzed reaction as their higher alumina content counterparts.

In U.S. Pat. Nos. 3,960,978 and 4,021,502, Plank, Rosinski and Givens disclose conversion of $C_2$-$C_5$ olefins, alone or in admixture with paraffinic components, into higher hydrocarbons over crystalline zeolites having controlled acidity. Garwood et al. have also contributed processing techniques for conversion of olefins to gasoline and distillate, as in U.S. Pat. Nos. 4,150,062, 4,211,640 and 4,227,992.

A number of U.S. patents teach heteroatom feed conversion. Examples of these are U.S. Pat. Nos. 3,894,104, 3,894,106, 3,894,107, 3,899,544, 3,965,205, 4,046,825, 4,156,698 and 4,311,865. Methanol is converted to gasoline in U.S. Pat. Nos. 4,302,619, 3,928,483 and 4,058,576 as examples. Methanol is converted to olefins and/or aromatics in, for example, U.S. Pat. Nos. 3,911,041, 4,025,571, 4,025,572, 4,025,575 and 4,049,735.

U.S. Pat. No. 4,380,685 teaches para-selective alkylation, transalkylation or disproportionation of a substituted aromatic compound to form a dialkylbenzene compound mixture over catalyst comprising zeolite characterized by a constraint index 1 to 12 and a silica:alumina mole ratio of at least 12:1, the catalyst having thereon incorporated various metals and phosphorus. Other patents covering alkylation and transalkylation include U.S. Pat. Nos. 4,127,616, 4,361,713, 4,365,104, 4,367,359, 4,370,508 and 4,384,155. Toluene is converted to para-xylene in U.S. Pat. Nos. 3,965,207, 3,965,208, 3,965,209, 4,001,346, 4,002,698, 4,067,920, 4,100,215 and 4,152,364, to name a few. Alkylation with olefins is taught, for example, in U.S. Pat. Nos. 3,962,364 and 4,016,218 and toluene is disproportionated in, for example, U.S. Pat. Nos. 4,052,476, 4,007,231, 4,011,276, 4,016,219 and 4,029,716. Isomerization of xylenes is taught in, for example, U.S. Pat. Nos. 4,100,214, 4.101,595, 4,158,676, 4,159,282, 4,351,979, 4,101,597, 4,159,283, 4,152,363, 4,163,028, 4,188,282 and 4,224,141.

SUMMARY OF THE INVENTION

A unique crystalline zeolite material having enhanced acid activity (measured by alpha value) has been discovered by the technique of contacting a high silica-containing zeolite, either as crystallized or after calcination, with an ammoniacal alkali metal aluminate solution, preferably an ammoniacal sodium aluminate solution, at a pH of at least 10. Such contacting by vacuum impregnation technique is particularly preferred. The use of this material as catalyst for acid-catalyzed chemical reactions is the object of the present invention.

The novel process of this invention permits the use of very high silica content zeolites which have all the desirable properties inherently possessed by such high silica materials, and yet have an acid activity (alpha value) which heretofore has only been possible to achieve with materials having a higher aluminum content in the robust framework.

EMBODIMENTS

As has heretofore been stated, the zeolite catalyst for use in the process of this invention has been treated in a special way to enhance its activity for acid-catalyzed reactions. The expression "high silica content" is intended herein to define a crystalline zeolite structure which has an initial silica-to-alumina mole ratio of at least 500, and more particularly greater than 500, up to and including those highly siliceous materials where the silica-to-alumina ratio is from greater than 1000 to as reasonably close to infinity as practically possible. This latter group of highly siliceous materials as exemplified by U.S. Pat. Nos. 3,941,871, 4,061,724, 4,073,865 and 4,104,294 wherein the materials are prepared from forming solutions to which no deliberate addition of aluminum was made. However, trace quantities of aluminum are present due to the impurity of the reactant solutions.

The preferred high silica content zeolite that is to be activated by the process of this invention has the crystal structure of an intermediate pore size zeolite, such as ZSM-5, evidenced by X-ray diffraction and "Constraint Index". This type of zeolite freely sorbs normal hexane, and has a pore size intermediate between the small pore zeolites such as Linde A and the large pore zeolites such as Linde X, the pore windows in the crystals being formed of 8-membered rings. The crystal framework densities of this type zeolite in the dry hydrogen form is not less than 1.6 grams per cubic centimeter. It is known that such zeolites exhibit constrained access to singly methyl-branched paraffins, and that this constrained access can be measured by cracking a mixture of n-hexane and 3-methylpentane and deriving therefrom a Constraint Index, as described in U.S. Pat. No. 4,231,899, incorporated herein by reference as to that description. Such zeolites exhibit a Constraint Index of 1 to 12 provided they have sufficient catalytic activity or are activated by the method of this invention to impart such activity. Intermediate pore zeolites useful for the process of this invention are those having a crystal structure exemplified by ZSM-5, ZSM-11, ZSM-12, ZSM-23, ZSM-35, ZSM-38 and ZSM-48. Column 4, line 30 to column 11, line 26 inclusive of U.S. Pat. No. 4,385,195 issued May 24, 1983, and the U.S. Patents referred to therein, are incorporated herein by reference for a detailed description including the X-ray diffraction patterns of the foregoing zeolites; a detailed description of crystal density and method for measuring this property; a detailed description of Constraint Index and method for measuring this property; and, for matter related to the foregoing.

The high silica content zeolite is treated with an ammoniacal alkali metal aluminate solution, preferably an ammoniacal sodium aluminate solution, at a pH of at least 10. A particularly preferred technique involves contacting said high silica zeolite with said ammoniacal alkali metal aluminate solution by vacuum impregnation.

The amount of solution utilized to treat the high silica-containing zeolite is not narrowly critical and the solution to zeolite ratio can vary from about 0.3 to less than about 10 grams of solution per gram of zeolite. The amount of solution will vary as a function of its concentration and the desired enhancement of activity.

The treatment is carried out by contacting said high silica zeolite, as crystallized or after calcination, with the above described solution at temperatures ranging from about 20° C. to about 50° C., and preferably from about 20° C. to about 35° C., for periods of time ranging from about 20 minutes to about 30 days; preferably from about ½ hour to about 5 days.

Following this treatment, the high silica-containing zeolite is processed into its catalytically active form by conventional techniques, such as base exchange with appropriate cations such as hydrogen, ammonium, rare earth, and mixtures thereof. The high silica-containing materials are then calcined by heating to a temperature in the range of 200°-600° C. in an atmosphere such as air, nitrogen, etc. and atmospheric, subatmospheric, or superatmospheric pressures for between about 1 and 48 hours. It is to be understood that the high silica-containing zeolites can, if desired, be incorporated in a matrix by techniques well known in the art. Conventional matrices include inorganic oxides, such as silica, alumina, silica-alumina, etc.

In U.S. Pat. No. 4,478,950, there is disclosed a method for enhancing the activity of high silica zeolites by contacting them with a solution containing both a source of aluminum ions and a quaternary ammonium compound at a pH of at least 7, and most preferably 9–12. The present invention represents an improvement in that expensive quaternary ammonium compounds are not needed and the procedure involves the use of common and relatively cheaper materials.

As is known in the art, the acid catalytic activity of a zeolite may be measured by its "alpha value," which is the ratio of the rate constant of a test sample for cracking normal hexane to the rate constant of a standard reference catalyst. Thus, an alpha value=1 means that the test sample and the standard reference have about the same activity. The alpha test is described in U.S. Pat. No. 3,354,078 and in *The Journal of Catalysis*, Vol. IV, pp. 527–529 (August 1965), each incorporated herein as to tht description. The relationship of alpha value to the intrinsic rate constants of other acid-catalyzed reactions is detailed in *Nature*, Vol. 309, pp. 589–591, June 14 1984, incorporated herein by reference as to that detail.

In general, organic compounds such as, for example, those selected from the group consisting of hydrocarbons, alcohols and ethers, are converted to conversion products such as, for example, aromatics and lower molecular weight hydrocarbons, by way of the present process by contact under organic ompound conversion conditions including a temperature of from about 100° C. to about 800° C., a pressure of from about 0.1 atmosphere (bar) to about 200 atmospheres, a weight hourly space velocity of from about 0.08 $hr^{-1}$ to about 2000 $hr^{-1}$ or a liquid hourly space velocity of from about 0.5 $hr^{-1}$ to about 100 $hr^{-1}$, and a hydrogen/feedstock organic, e.g., hydrocarbon, compound mole ratio of from 0 (no added hydrogen) to about 100.

Such conversion processes include, as a non-limiting example, cracking hydrocarbons to lower molecular weight hydrocarbons with reaction conditions preferably including a temperature of from about 300° C. to about 800° C., a pressure of from about 0.1 atmosphere (bar) to about 35 atmospheres and a weight hourly space velocity of from about 0.1 $hr^{-1}$ to about 20 $hr^{-1}$.

The following examples are for the purpose of illustrating this invention, and are not intended to limit the scope thereof, which scope is defined by this entire specification including the claims appended thereto. All alpha values reported in these examples refer to measurements made with the sample in the hydrogen form.

EXAMPLE 1

A 2 gram sample of ZSM-5 zeolite having a silica-to-alumina ratio of about 26,000 and a sodium content of about 0.23 weight percent was impregnated with 3 grams of 5 weight percent sodium aluminate solution and calcined in air at 538° C. for 20 hours.

EXAMPLE 2

The product of Example 1 was treated with a 1 Normal, 8 weight percent solution of ammonium nitrate and calcined as in Example 1.

EXAMPLE 3

A sample of the same ZSM-5 used in Example 1 was vacuum impregnated with a solution of sodium aluminate which was diluted by an equal volume of concentrated (12N) $NH_4OH$. The pH was 12.4. After 30 minutes, the sample was dried and submitted to three cycles of 1N $NH_4NO_3$ treatment followed by hot water washing. The sample was dried and calcined at 538° C. as in Example 1.

ACID CATALYSIS

The products of Examples 1, 2 and 3 were evaluated for acid activity by the alpha test.

The results are shown in the following table:

TABLE 1

| Activity of High Silica ZSM-5 After Treatment | | |
|---|---|---|
| Example | | Alpha |
| 1 | $NaAlO_2$ treat | 0.4 |
| 2 | $NaAlO_2/NH_4NO_3$ treat | 0.2 |
| 3 | $NaAlO_2/NH_4OH$ imp + $NH_4NO_3$ treat | 12 |

From the above table, it can be seen that the process of this invention resulted in an indication of dramatically increased acid activity. The procedure of Examples 1 and 2 did not result in any significant improvement, whereas the catalyst preparation method of Example 3 resulted in an enhanced conversion process.

What is claimed is:

1. A process for manufacturing a hydrocarbon product from a catalytically convertible organic feed selected from the group consisting of hydrocarbons, alcohol and ether, said product being selected from the group consisting of gasoline, aromatic hydrocarbons and hydrocarbons of lower molecular weight than said feed, which process comprises: contacting said organic feed under conversion conditions with a catalyst comprising an activated zeolite product and having acid activity in order to effect acid-catalyzed reactions, said conditions including a temperature of from about 100° C. to about 800° C., a pressure of from about 0.1 atmosphere to about 200 atmospheres, a liquid hourly space velocity of from about 0.5 $hr^{-1}$ to about 100 $hr^{-1}$ and a hydrogen/feed mole ratio of from 0 to about 100, said zeolite product having been produced by the method which comprises treating a crystalline zeolite having a Constraint Index of 1 to 12 and an initial silica-to-alumina mole ratio of at least 500 with an ammoniacal solution consisting essentially of ammonium hydroxide and alkali metal aluminate for a period of time ranging from about ½ hour to about 5 days at a temperature of from about 20° C. to about 50° C. and a pH of at least 10 and thereafter ammonium ion exchanging and calcining said zeolite.

2. The process of claim 1 wherein said alkali metal aluminate is sodium aluminate.

3. The process of claim 1 wherein said crystalline zeolite has a silica-to-alumina mole ratio greater than 1000.

4. The process of claim 2 wherein said crystalline zeolite has a silica-to-alumina mole ratio greater than 1000.

5. The process of claim 1 wherein said treating with an ammoniacal solution of an alkali metal aluminate is by vacuum impregnation.

6. The process of claim 1 wherein said crystalline zeolite has the structure of a zeolite selected from the group consisting of ZSM-5, ZSM-11, ZSM-12, ZSM-23, ZSM-35, ZSM-38 and ZSM-48.

7. The process of claim 6 wherein said crystalline zeolite has the structure of ZSM-5.

8. The process of claim 1 wherein said conversion conditions include a temperature of from about 300° C. to about 800° C., a pressure of from about 0.1 atmosphere to about 35 atmospheres and a weight hourly space velocity of from about 0.1 $hr^{-1}$ to about 20 $hr^{-1}$.

9. The process of claim 1 wherein said organic feed consists of hydrocarbons and said catalytic conversion is cracking to hydrocarbon products having a lower molecular weight than said feed.

10. The process of claim 1 wherein said organic feed is an alcohol or ether.

11. The process of claim 1 wherein said feed is converted to gasoline.

12. The process of claim 1 wherein said feed is converted to lower molecular weight hydrocarbons.

13. The process of claim 9 wherein said crystalline zeolite to be treated is ZSM-5.

14. The process of claim 1 wherein said feed is converted to aromatic hydrocarbons.

* * * * *